US012678766B2

(12) United States Patent  
Ishida et al.

(10) Patent No.: US 12,678,766 B2  
(45) Date of Patent: *Jul. 14, 2026

(54) CARBONACEOUS MATERIAL AND METHOD FOR PRODUCING SAME, AND FLUORINE-CONTAINING ORGANIC COMPOUND REMOVING MATERIAL, WATER PURIFICATION FILTER, AND WATER PURIFIER

(71) Applicant: KURARAY CO., LTD., Kurashiki (JP)

(72) Inventors: Shuichi Ishida, Bizen (JP); Kiyoto Otsuka, Bizen (JP); Tetsuya Hanamoto, Bizen (JP); Hiroe Yoshinobu, Bizen (JP)

(73) Assignee: KURARAY CO., LTD., Kurashiki (JP)

( * ) Notice: Subject to any disclaimer, the term of this patent is extended or adjusted under 35 U.S.C. 154(b) by 577 days.

This patent is subject to a terminal disclaimer.

(21) Appl. No.: 18/032,608

(22) PCT Filed: Oct. 14, 2021

(86) PCT No.: PCT/JP2021/038008  
§ 371 (c)(1),  
(2) Date: Apr. 19, 2023

(87) PCT Pub. No.: WO2022/085550  
PCT Pub. Date: Apr. 28, 2022

(65) Prior Publication Data  
US 2023/0390731 A1     Dec. 7, 2023

(30) Foreign Application Priority Data

Oct. 23, 2020     (JP) ................................. 2020-177898

(51) Int. Cl.  
B01J 20/20 (2006.01)  
B01J 20/28 (2006.01)  
(Continued)

(52) U.S. Cl.  
CPC ......... B01J 20/20 (2013.01); B01J 20/28011 (2013.01); B01J 20/28066 (2013.01); (Continued)

(58) Field of Classification Search  
CPC ........................... B01J 20/20; B01J 20/28011; B01J 20/28066; B01J 20/28071; B01J 20/2808; (Continued)

(56) References Cited

U.S. PATENT DOCUMENTS 4,576,929 A     3/1986     Shimazaki  
4,696,742 A     9/1987     Shimazaki  
(Continued)

FOREIGN PATENT DOCUMENTS

JP     S60-137811 A     7/1985  
JP     S61-282430 A     12/1986  
(Continued)

OTHER PUBLICATIONS

Jia, Hong Min, Yan Hui Wang, and Guo Zhong Xu. "Study on optimization of activated carbon preparation process based on apricot shell." Advanced Materials Research 785 (2013): 739-744.*  
(Continued)

*Primary Examiner* — Richard M Rump  
(74) *Attorney, Agent, or Firm* — Element IP, PLC

(57)     ABSTRACT

One aspect of the present invention relates to a carbonaceous material that has a benzene adsorption amount of 30 to 60%, a vitamin B12 adsorption amount of more than 50.0 mg/g, and a micropore volume of mesopores of 0.13 to 0.30 cm$^3$/g as calculated from a nitrogen adsorption isotherm by a BJH method.

14 Claims, 3 Drawing Sheets

(51) Int. Cl.
| | |
|---|---|
| *B01J 20/30* | (2006.01) |
| *C02F 1/28* | (2023.01) |
| *C02F 101/32* | (2006.01) |
| *C02F 101/36* | (2006.01) |

(52) U.S. Cl.
CPC ..... *B01J 20/28071* (2013.01); *B01J 20/2808* (2013.01); *B01J 20/3078* (2013.01); *C02F 1/286* (2013.01); *C02F 2101/322* (2013.01); *C02F 2101/36* (2013.01)

(58) Field of Classification Search
CPC . B01J 20/3078; C02F 1/286; C02F 2101/322; C02F 2101/36; C01B 32/36; C01B 32/312; C01B 32/318; C01B 32/336
See application file for complete search history.

(56) References Cited

U.S. PATENT DOCUMENTS

| | | |
|---|---|---|
| 2010/0000947 A1 | 1/2010 | Koizumi et al. |
| 2019/0291073 A1 | 9/2019 | Hanamoto et al. |
| 2022/0002161 A1 | 1/2022 | Nishinami et al. |
| 2022/0242737 A1 | 8/2022 | Ishida et al. |

FOREIGN PATENT DOCUMENTS

| | | |
|---|---|---|
| JP | H08-26711 A | 1/1996 |
| JP | 2000281325 A | 10/2000 |
| JP | 2003290654 A | 10/2003 |
| JP | 2010158662 A | 7/2010 |
| JP | 2011045853 A | 3/2011 |
| JP | 2013220413 A | 10/2013 |
| JP | 2015093257 A | 5/2015 |
| JP | 2020019016 A | 2/2020 |
| JP | 2020023420 A | 2/2020 |
| JP | 2020049451 A | 4/2020 |
| JP | 7060772 B1 | 4/2022 |

| | | |
|---|---|---|
| WO | WO-2017199717 A1 | 11/2017 |
| WO | WO-2020096008 A1 | 5/2020 |
| WO | WO-2020218370 A1 | 10/2020 |

OTHER PUBLICATIONS

Hisashi Tamai et al, "Synthesis of Extremely Large Mesoporous Activated Carbon and Its Unique Adsorption for Giant Molecules", Chem. Mater., vol. 8, No. 2, 1996, pp. 454-462.

International Search Report issued Dec. 21, 2021 in PCT/JP2021/038008 (with English translation), 4 pages.

Kenji Shimazaki, "Preparation of Polyacrylonitrile Based Activated Carbon Fiber (PAN-ACF) Having High Mesopore Volume", Nippon Kagaku Kaishi (by The Chemical Society of Japan), Issue 7, vol. 1993, 1993, pp. 807-812 (with partial English translation).

Minkyu Park et al, "Adsorption of perfluoroalkyl substances (PFAS) in groundwater by granular activated carbons: Roles of Hydrophobicity of PFAS and carbon characteristics", Water Research, 170, 115364, 2020, 28 pages.

Notice of Opposition issued Nov. 25, 2022 in Japanese Patent No. 7060772 (with partial English translation), 2 pages.

Notice of Reasons for Revocation issued Jan. 30, 2023 in Japanese Patent No. 7060772, 14 pages (with partial English translation).

Opposition to Grant of Patent issued Oct. 21, 2022 in Japanese Patent No. 7060772 (with partial English translation), 18 pages.

Opposition to Grant of Patent issued Oct. 21, 2022 in Japanese Patent No. 7060772 (with partial English translation), 23 pages.

Opposition to Grant of Patent issued Oct. 26, 2022 in Japanese Patent No. 7060772 (with partial English translation), 18 pages.

Decision on Opposition issued Sep. 26, 2023 in Japanese Patent No. 7060772 (with partial English translation), 41 pages.

International Preliminary Report on Patentability and Written Opinion issued May 4, 2023 in PCT/JP2021/038008 (with English translation), 12 pages.

Third Party Observations issued Feb. 13, 2026, in corresponding Japanese Patent Application No. 2022-066387 (with machine-generated English translation of Cover letter and partial English translation of Official Communication) 8 pages.

* cited by examiner

CARBONACEOUS MATERIAL AND METHOD FOR PRODUCING SAME, AND FLUORINE-CONTAINING ORGANIC COMPOUND REMOVING MATERIAL, WATER PURIFICATION FILTER, AND WATER PURIFIER

TECHNICAL FIELD

The present invention relates to a carbonaceous material. Furthermore, the present invention relates to a method for producing the carbonaceous material, and a fluorine-containing organic compound removing material, a water purification filter, and a water purifier using the carbonaceous material.

BACKGROUND ART

In recent years, there has been an increasing interest in safety and health related to the water quality of tap water, and it is desired to remove various harmful substances.

Fluorine-containing organic compounds have unique properties (excellent in heat resistance and chemical resistance, usable even under severe conditions, no light absorbing ability) that cannot be achieved by other substances, and therefore have been used in various applications such as surfactants, emulsifiers, water repellents, fire extinguishing agents, waxes, carpet cleaning agents, and coating agents. Recently, applications as functional materials such as surface treatment agents for semiconductors and fuel cell constituent materials are increasing.

However, for several years, it has been reported mainly by researchers in the United States and Canada that some fluorine-containing organic compounds are accumulated in environmental water and in wildlife bodies. Typical examples thereof are perfluoroalkyl carboxylic acids typified by perfluorooctanoic acid (PFOA:$C_7F_{15}COOH$) and perfluoroalkyl sulfonic acids typified by perfluorooctanesulfonic acid (PFOS:$C_8F_{17}SO_3H$). Thereafter, researchers in Europe and Japan also entered the environmental analysis research, and as a result, it was revealed that these compounds exist in the environment on a global scale including Japan. In response to such a situation, efforts have started to reduce the environmental risk of fluorine-containing organic compounds (perfluoroalkyl compound and polyfluoroalkyl compound; hereinafter, it may also be referred to as "PFAS").

For example, a method has been reported in which an activated carbon in which particles passing through a 75 μm filter account for 90% or more of total particles is brought into contact with water to be treated containing a fluorine-containing surfactant to remove the fluorine-containing surfactant from the water to be treated (Patent Literature 1).

As in the technique proposed in Patent Literature 1, there has been a report on removal of a fluorine-containing organic compound from water using an activated carbon. However, the technique described in Patent Literature 1 is a technique mainly used in batch applications (treatment and purification of factory wastewater). The technique reported so far is a method for removing PFAS from raw water (river water or the like) in such batch applications or water purification plants, and in the present situation, research on means for removing a fluorine-containing organic compound by a water purifier or the like has not progressed much yet.

The water to be treated is different between the treatment in a water purification plant or the like and the treatment by a water purifier (raw water and tap water), and the treatment time of the water to be treated is also significantly different. Therefore, the PFAS removing means in a water purification plant cannot be directly applied to, for example, a water purifier for home use.

Therefore, a main object of the present invention is to provide a carbonaceous material having high PFAS (PFOS, PFOA, etc.) removal performance which can be used also in a water purifier application.

CITATION LIST

Patent Literature

Patent Literature 1: JP 2010-158662 A

SUMMARY OF INVENTION

As a result of intensive studies to solve the above problems, the present inventors found that the above problems can be solved by a carbonaceous material having the following configuration, and completed the present invention by further conducting studies based on the findings.

That is, the carbonaceous material according to one aspect of the present invention has the benzene adsorption amount of 30 to 60%, a vitamin B12 adsorption amount of more than 50.0 mg/g, and a micropore volume of mesopores of 0.13 to 0.30 $cm^3$/g as calculated from a nitrogen adsorption isotherm by a BJH method.

A method for producing a carbonaceous material according to another aspect of the present invention is characterized by using a fluidized bed furnace, the method including introducing, separately from a fluidized gas introduced from a hearth, an oxygen-containing gas into the fluidized bed furnace so that the oxygen concentration in a gas that is a total gas of the fluidized gas and the oxygen-containing gas is 0.004 to 1 vol %.

A water purification filter according to still another aspect of the present invention contains the carbonaceous material and the fibrous binder as described above, the fibrous binder has a CSF value of 10 to 150 mL, and 4 to 10 parts by mass of the fibrous binder is contained with respect to 100 parts by mass of the carbonaceous material.

DESCRIPTION OF EMBODIMENTS

Figure 1:
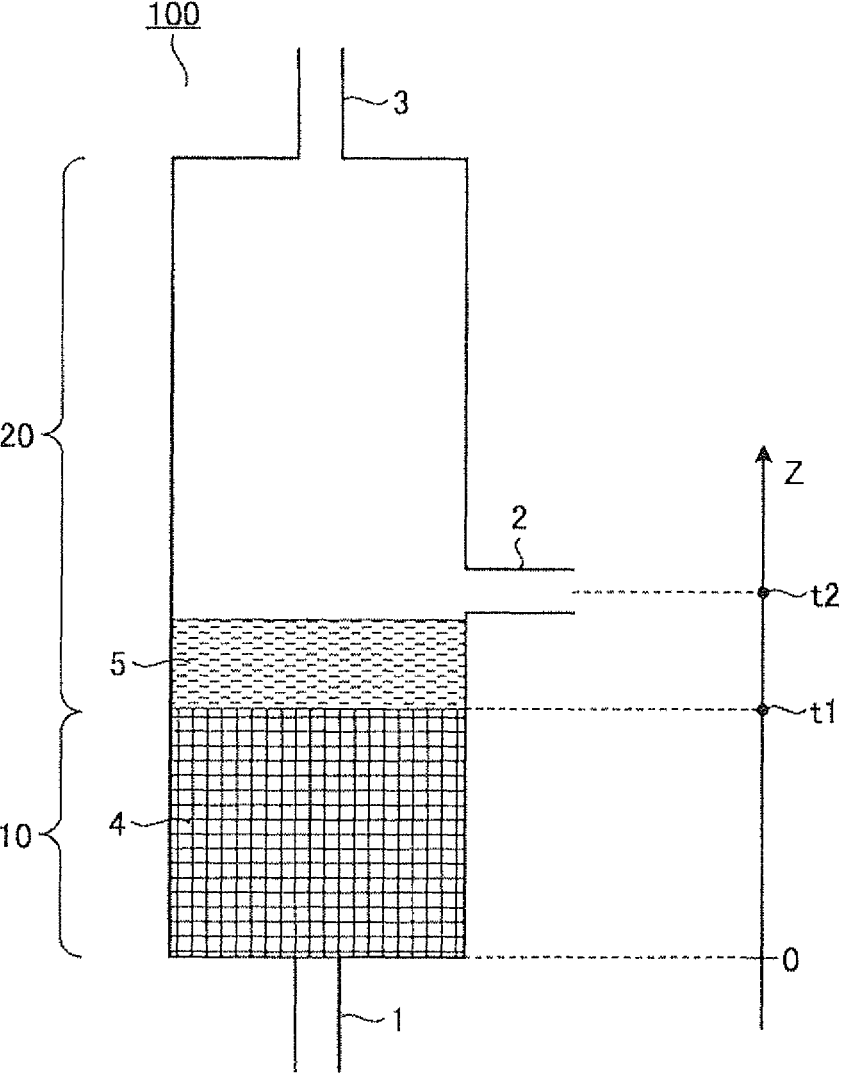
FIG. 1 is a schematic view for explaining a method for producing a carbonaceous material using a fluidized bed furnace in an embodiment of the present invention.

Hereinafter, embodiments according to the present invention is specifically described, but the present invention is not limited thereto.

[Carbonaceous Material]

The carbonaceous material according to an embodiment of the present invention has the benzene adsorption amount of 30 to 60%, a vitamin B12 adsorption amount of more than 50.0 mg/g, and a micropore volume of mesopores of 0.13 to 0.30 cm³/g as calculated from a nitrogen adsorption isotherm by a BJH method.

According to the above configuration, it is possible to provide a carbonaceous material having high PFAS (PFOS, PFOA, etc.) removal performance which can be used also in the water purifier application.

(Benzene Adsorption Amount)

The benzene adsorption amount is an index indicating the degree of progress of the activation of the carbonaceous material. The carbonaceous material according to the present embodiment is suitable for the adsorption of PFAS because the benzene adsorption amount is in the range of 30 to 60%.

From the viewpoint of having excellent PFAS adsorption performance, the benzene adsorption amount of the carbonaceous material is within a range of 30 to 60%, and the upper limit is preferably 58% or less, more preferably 56% or less, and still more preferably 55% or less, and the lower limit is preferably 40% or more, more preferably 42% or more, and still more preferably 44% or more.

The benzene adsorption amount of the carbonaceous material can be measured by the method described in [Measurement of benzene adsorption amount] described later.

(Vitamin B12 Adsorption Amount)

Vitamin B12 (cyanocobalamin) has a large molecular weight of about 1355, and the vitamin B12 adsorption amount is an index of adsorption characteristics for a substance having a large molecular size. Since the carbonaceous material according to the present embodiment has a vitamin B12 adsorption amount of more than 50 mg/g, the carbonaceous material is suitable for adsorption of PFAS.

From the viewpoint of achieving excellent PFAS adsorption performance, the vitamin B12 adsorption amount of the carbonaceous material is more than 50 mg/g, preferably 60 mg/g or more, more preferably 70 mg/g or more, and still more preferably 80 mg/g or more. The upper limit of the vitamin B12 adsorption amount is not particularly limited, but is usually preferably 500 mg/g or less, more preferably 460 mg/g or less, and still more preferably 420 mg/g or less from the balance with other physical property values such as the benzene adsorption amount.

The vitamin B12 adsorption amount adsorbed to the carbonaceous material can be measured by the method described in [Measurement of vitamin B12 adsorption amount] described later.

(Mesopore Volume)

The pores of the carbonaceous material can be classified into micropores (diameter: less than 2 nm), mesopores (diameter: 2 to 50 nm), and macropores (diameter: more than 50 nm) according to their diameters (the parentheses indicate the IUPAC classification criteria). The mesopores are larger than the micropores, and the volume of the mesopores can be mainly an index of adsorption characteristics of a substance having a large molecular size. The carbonaceous material according to the present embodiment has a mesopore volume in the range of 0.130 to 0.30 cm³/g, thereby making the carbonaceous material more suitable for adsorption of PFAS.

From the viewpoint of achieving excellent PFAS adsorption performance, the mesopore volume of the carbonaceous material is in the range of 0.130 to 0.300 cm³/g, and the lower limit is preferably 0.140 cm³/g or more, and more preferably 0.145 cm³/g or more. The upper limit is preferably 0.280 cm³/g or less, and more preferably 0.250 cm³/g or less.

The mesopore volume of the carbonaceous material can be calculated from the nitrogen adsorption isotherm using the BJH (Barrett-Joyner-Halenda) method. The measurement of the nitrogen adsorption isotherm and the calculation of the mesopore volume can be performed by the methods described in [Measurement of nitrogen adsorption isotherm] and [Measurement of mesopore micropore volume by BJH method] described later.

Although the technical significance of each of the benzene adsorption amount, the vitamin B12 adsorption amount, and the mesopore micropore volume in the present embodiment has been described above, the relationship between the structure of the carbonaceous material (adsorption medium) and the adsorption characteristics to the adsorbent is complicated, and the benzene adsorption amount, the vitamin B12 adsorption amount, and the mesopore micropore volume may not directly and independently correlate with the adsorption characteristics to the adsorbent. In order to provide a carbonaceous material capable of efficiently removing PFAS, it is considered that the balance among the benzene adsorption amount, the vitamin B12 adsorption amount, and the mesopore volume is important. As described later, in the present embodiment, a carbonaceous material having the characteristics was successfully produced by a specific production method using a fluidized bed furnace.

The carbonaceous material of the present embodiment is not particularly limited in other characteristics as long as the benzene adsorption amount, the vitamin B12 adsorption amount, and the mesopore micropore volume are each within the above ranges as described above, but it is considered that the carbonaceous material also preferably has the characteristics described later in order to more reliably obtain the effects of the present invention.

(Specific Surface Area)

The carbonaceous material preferably has a specific surface area in the range of 1200 to 2000 m²/g from the viewpoint of achieving adsorption removal performance required for a water purifier at a high level. The lower limit of the specific surface area is more preferably 1300 m²/g or more or 1400 m²/g or more, and the upper limit is more preferably 1900 m²/g or less or 1800 m²/g or less.

The specific surface area of the carbonaceous material can be calculated from the nitrogen adsorption isotherm using the BET method. The measurement of the nitrogen adsorption isotherm and the calculation of the specific surface area can be performed by the methods described in [Measurement of nitrogen adsorption isotherm] and [Measurement of specific surface area] described later.

(Average Micropore Diameter)

From the viewpoint of achieving more excellent PFAS adsorption performance, the carbonaceous material preferably has an average micropore diameter in the range of 1.85 to 1.90 nm. The lower limit of the average micropore diameter is more preferably 1.86 nm or more or 1.87 nm or more, and the upper limit is preferably 1.89 nm or less or 1.88 nm or less.

The average micropore diameter of the carbonaceous material can be calculated from the nitrogen adsorption isotherm. The measurement of the nitrogen adsorption isotherm and the calculation of the average micropore diameter can be performed by the methods described in [Measurement of nitrogen adsorption isotherm] and [Measurement of total micropore volume and average micropore diameter] described later.

(Electrical Conductivity)

The carbonaceous material according to the present embodiment preferably has an electrical conductivity measured by powder resistance measurement at a load of 12 kN in the range of 3 to 9 S/cm. When the electrical conductivity is in this range, specifically, when the carbonaceous material has a structure in which the electrical conductivity is in the above range, the carbonaceous material can achieve a high level of adsorption removal performance required for a water purifier. The upper limit of the electrical conductivity is preferably 8.7 S/cm or less, more preferably 8.3 S/cm or less, and still more preferably 8 S/cm or less, and the lower limit is preferably 5.3 S/cm or more, more preferably 5.6 S/cm or more, and still more preferably 6 S/cm or more.

The electrical conductivity of the carbonaceous material can be measured by the method described in [Measurement of electrical conductivity] described later.

The shape of the carbonaceous material is not particularly limited, and may be, for example, any shape such as a particulate shape or a fibrous shape (thread-like, woven cloth-like, felt-like), and can be appropriately selected according to a specific use mode, but a particulate shape is preferable because adsorption performance per unit volume is high. In the case of a particulate carbonaceous material, the dimension thereof is not particularly limited, and the particle size and the like may be appropriately adjusted according to the specific use mode.

A raw material (carbonaceous precursor) of the carbonaceous material is not particularly limited. Examples thereof include a plant-based carbonaceous precursor (for example, plant-derived materials such as wood, sawdust, charcoal, fruit shells such as a coconut shell and a walnut shell, a fruit seed, a pulp production by-product, lignin, and waste molasses), a mineral-based carbonaceous precursor (mineral-derived materials such as peat, lignite, brown coal, bituminous coal, anthracite, coke, coal tar, coal pitch, petroleum distillation residue, and petroleum pitch), a synthetic resin-based carbonaceous precursor (for example, a material derived from a synthetic resin such as a phenol resin, polyvinylidene chloride, or an acrylic resin.), and a natural fiber-based carbonaceous precursor (for example, a material derived from natural fibers such as natural fibers such as cellulose and regenerated fibers such as rayon). Among them, the plant-based carbonaceous precursor is preferable because it is easy to obtain a carbonaceous material having excellent adsorption performance for a substance to be removed defined by the household product quality display method. Thus, in a preferred embodiment, the carbonaceous material is derived from the plant-based carbonaceous precursor. From the viewpoint of achieving a carbonaceous material from which PFAS can be more efficiently removed, a coconut shell is preferably used as a raw material. Thus, in a particularly preferred embodiment, a coconut shell is used as the plant-based carbonaceous precursor.

The carbonaceous material according to the present embodiment is suitable for adsorption of PFAS, and exhibits an excellent effect particularly in the water purifier application. Therefore, the carbonaceous material of the present embodiment can be suitably used as a carbonaceous material for purifying water (carbonaceous material for water purification), and can be more suitably used as a carbonaceous material for purifying tap water (carbonaceous material for water purification of tap water).

In particular, in the carbonaceous material of the present embodiment, the removal performance of the fluorine-containing organic compound obtained under the following measurement conditions is preferably 12000 or more in Bed Volume.

(Measurement Conditions)

Water (containing TOC of 1.2 ppm) adjusted to a PFOA concentration of 50±10 ppt and a PFOS concentration of 50±10 ppt is used as test water in a stainless steel column filled with a carbonaceous material and having a diameter of 6.2 mm, a height of 25.4 mm, and an internal volume of 0.77 mL, and under conditions of 7.2 mL/min and a space velocity (SV) of 560 $hr^{-1}$, the removal performance is defined as the amount of water (Bed Volume) from the start of passing water to the breakthrough point, which is obtained when water is passed upflow and the point at which the removal rate becomes lower than 80% is defined as the breakthrough point. Accordingly, it is considered that the excellent removal effect can be more reliably obtained.

Since the carbonaceous material of the present embodiment can efficiently adsorb the fluorine-containing organic compound, it can be suitably used as a fluorine-containing organic compound removing material. Therefore, the present invention also includes a fluorine-containing organic compound removing material made of the carbonaceous material.

[Method for Producing Carbonaceous Material]

The carbonaceous material according to an embodiment of the present invention is produced by activating the carbonaceous precursor described above. When carbonization is required prior to activation, oxygen or air is usually blocked, and carbonization may be performed at, for example, 400 to 800° C. (preferably 500 to 800° C., more preferably 550 to 750° C.). In this case, the carbonaceous material is produced by activating the original coal obtained by carbonizing the carbonaceous precursor.

In order to achieve a carbonaceous material having a benzene adsorption amount, a vitamin B12 adsorption amount, and a mesopore micropore volume (further, characteristics such as a specific surface area, an average micropore diameter, and electrical conductivity, which may be optionally satisfied, as necessary) within specific ranges, an activation method is important. The method for producing a carbonaceous material according to the present embodiment (Hereinafter, it is also simply referred to as the "production method of the present embodiment") is characterized in that a fluidized bed furnace (fluidized bed activation furnace) is used as an activation furnace, and an oxygen-containing gas is introduced into the fluidized bed furnace separately from the fluidized gas introduced from the hearth. As a result, it is possible to achieve a carbonaceous material having a benzene adsorption amount of 40 to 60% and a vitamin B12 adsorption amount of more than 50 mg/g, which has been difficult to achieve by a conventional method using a rotary kiln as an activation furnace or a conventional method of introducing a fluidized gas exclusively into a fluidized bed furnace from a hearth.

The fluidized gas is not particularly limited as long as it has an action of fluidizing and activating the original coal, and a conventionally known fluidized gas may be used. For example, the fluidized gas includes a gas containing water vapor and/or carbon dioxide. From the industrial point of view, a combustion gas of hydrocarbon (for example, light gases such as methane, propane, and butane, and liquid fuels such as light oil, kerosene, and heavy oil) is preferably used because the combustion gas contains water vapor and carbon dioxide appropriately.

From the viewpoint of efficiently activating the original coal, the water vapor concentration in the fluidized gas is preferably 10 to 40 vol %. The upper limit is more preferably 35 vol % or less or 30 vol % or less, and the lower limit is more preferably 12 vol % or more, 14 vol % or more, or 15 vol % or more. When carbon dioxide is contained in the fluidized gas, the concentration of carbon dioxide in the fluidized gas is preferably 15 vol % or less. The upper limit is more preferably 14 vol % or less or 13 vol % or less, and the lower limit is more preferably 8 vol % or more, 9 vol % or more, or 10 vol % or more.

In the production method of the present embodiment, the oxygen-containing gas is introduced into the fluidized bed furnace separately from the fluidized gas introduced from the hearth. The oxygen-containing gas is introduced into the fluidized bed furnace so that the total oxygen concentration in a total gas of the fluidized gas and the oxygen-containing gas becomes 0.004 to 1 vol %. From the viewpoint of obtaining a carbonaceous material from which PFAS can be more efficiently removed, the oxygen concentration in the total gas of the fluidized gas and the oxygen-containing gas is preferably 0.005 vol % or more, 0.01 vol % or more, 0.02 vol % or more, 0.03 vol % or more, 0.04 vol % or more, or 0.05 vol % or more. The upper limit of the oxygen concentration is preferably 0.95 vol % or less, 0.9 vol % or less, 0.85 vol % or less, or 0.8 vol % or less. In the present embodiment, the oxygen concentration in the total gas of the fluidized gas and the oxygen-containing gas is a concentration in terms of charge calculated based on the composition and the introduction amount of the fluidized gas and the composition and the introduction amount of the oxygen-containing gas.

The oxygen-containing gas is not particularly limited as long as it contains oxygen, and for example, air and a gas obtained by diluting air with another gas (for example, inert gas such as nitrogen) can be used. The oxygen concentration in the oxygen-containing gas is not particularly limited as long as the oxygen concentration in the total gas of the fluidized gas and the oxygen-containing gas is in the range of 0.004 to 1 vol %, but is preferably 20 vol % or less, more preferably 15 vol % or less, 10 vol % or less, 8 vol % or less, 6 vol % or less, 5 vol % or less, 4 vol % or less, 3 vol % or less, or 2 vol % or less. The lower limit of the oxygen concentration in the oxygen-containing gas can be usually 0.1 vol % or more, 0.2 vol % or more, or the like. Incidentally, oxygen may be contained in the fluidized gas introduced from the hearth, but when the combustion gas is used as the fluidized gas, it is generally difficult to control a small amount of oxygen concentration in the combustion gas, and thus it is preferable to control the oxygen concentration by oxygen derived from the oxygen-containing gas.

Hereinafter, the production method of the present embodiment is described with reference to the drawings.

FIG. 1 is a schematic view of a fluidized bed furnace (fluidized bed activation furnace) 100 used in the production method of the present embodiment. In the following description, reference numerals denote 1: fluidized gas inlet, 2: oxygen-containing gas inlet, 3: gas outlet, 4: gas dispersion layer, 5: original coal, 6: original coal (during fluid activation), 7: fluidized gas, 8: oxygen-containing gas, 9: exhaust gas, 10: gas dispersion part, 20: fluidized bed part, and 100: fluidized bed furnace (fluidized bed activation furnace), respectively.

The fluidized bed furnace 100 includes the fluidized gas inlet 1, the oxygen-containing gas inlet 2, the gas outlet 3, and the gas dispersion layer 4. The fluidized gas inlet 1 is generally disposed in a hearth, and the fluidized gas (not shown) introduced into the fluidized bed furnace 100 passes through the gas dispersion layer 4, comes into contact with the original coal 5, and is subjected to fluid activation of the original coal. The fluidized gas is then discharged out of the furnace from the gas outlet 3, which is generally disposed in the furnace ceiling. In FIG. 1, a flow main direction (that is, the flow direction from the hearth to the furnace ceiling) of the fluidized gas is represented as a direction Z.

The gas dispersion layer 4 is not particularly limited as long as it has a function of dispersing the flow of the fluidized gas introduced from the fluidized gas inlet 1 and uniformly bringing the fluidized gas into contact with the original coal 5, and a conventionally known gas dispersion layer may be used. For example, when a fluidized gas is dispersed using a perforated plate, a buffer region from the hearth to the perforated plate is referred to as the gas dispersion layer 4. As shown in FIG. 1, the gas dispersion layer 4 is disposed on the upstream side in the fluidized bed furnace as viewed in the flow main direction Z of the fluidized gas. In the present embodiment, a region including the gas dispersion layer 4 is referred to as the gas dispersion part 10. Therefore, the fluidized bed furnace 100 includes the gas dispersion part 10 on the upstream side in the fluidized bed furnace as viewed in the flow main direction Z of the fluidized gas.

The fluidized bed furnace 100 also includes the fluidized bed part 20 on the downstream side in the fluidized bed furnace as viewed in the flow main direction Z of the fluidized gas. In the fluidized bed part 20, the original coal 5 and the fluidized gas come into contact with each other to perform fluid activation of the original coal 5.

As described above, the production method of the present embodiment is characterized by including introducing the oxygen-containing gas into the fluidized bed furnace separately from the fluidized gas introduced from the hearth. In order to provide a carbonaceous material in which the benzene adsorption amount and the vitamin B12 adsorption amount are within specific ranges, the introduction position of the oxygen-containing gas is important. That is, when the upstream end position of the gas dispersion part in the flow main direction Z of the fluidized gas is 0 (m), the downstream end position is t1 (m) (t1>0.), and the position at which the oxygen-containing gas is introduced is t2 (m), it is preferable to satisfy the relationship of 0.5t1≤t2. When 0.5t1>t2, it is difficult to achieve the carbonaceous material according to the present embodiment in which the benzene adsorption amount and the vitamin B12 adsorption amount are in specific ranges. It is preferably 0.7t1≤t2, more preferably 0.8t1≤t2, 0.9t1≤t2, or t1≤t2, particularly preferably t1<t2, 1.2t1≤t2, 1.4t1≤t2, or 1.5t1≤t2. The upper limit of t2 is not particularly limited as long as the oxygen-containing gas can come into contact with the original coal during the fluid activation and may be any position up to the furnace ceiling, but when the height (thickness) of the fluidized bed part 20 as viewed in the direction Z is T (m) (that is, T=(furnace ceiling height−t1)), it is preferable that t2≤0.8T, t2≤0.7T, t2≤0.6T, or t2≤0.5T. When the oxygen-containing gas inlet 2 has a width (thickness) as viewed in the direction Z, the introduction position t2 of the oxygen-containing gas refers to the center position of the width (thickness).

Figure 2:
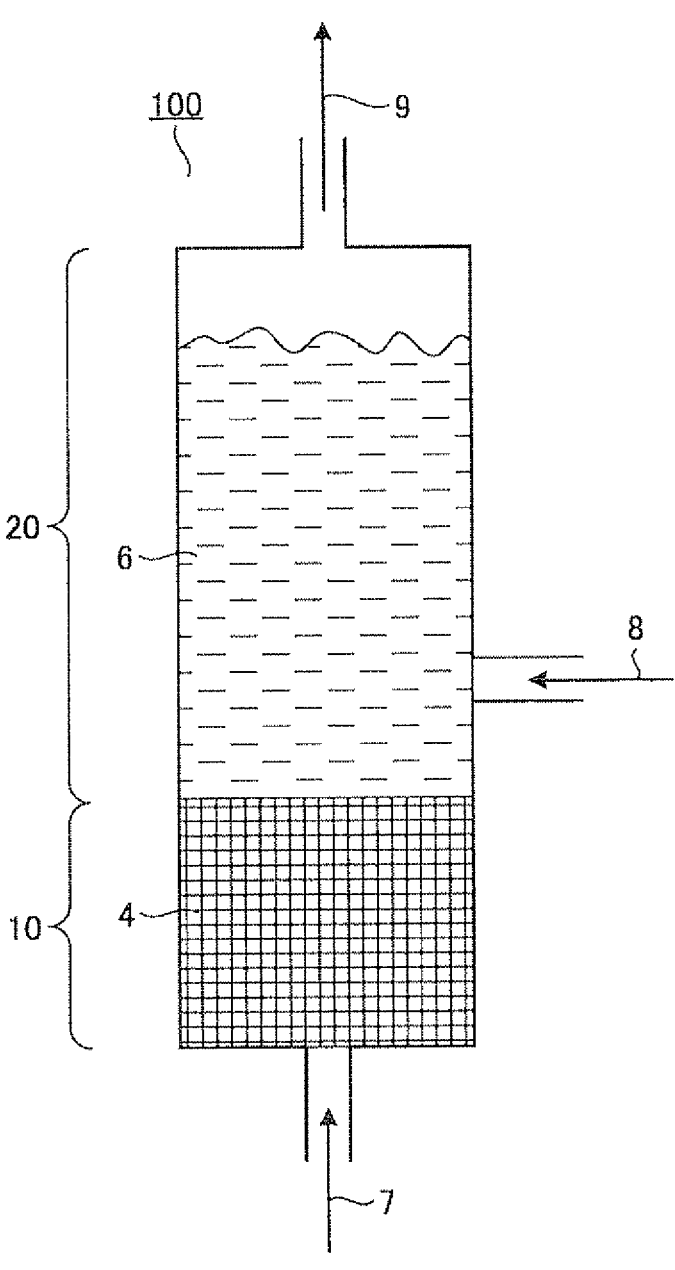
FIG. 2 is a schematic view for explaining a method for producing a carbonaceous material using a fluidized bed furnace in an embodiment of the present invention.

FIG. 2 is a schematic view showing a state in which the original coal is fluidized and activated using the fluidized bed furnace shown in FIG. 1. In FIG. 2, members and portions denoted by the same reference numerals as in FIG. 1 represent the same members and portions as in FIG. 1.

In FIG. 2, the fluidized gas 7 is introduced into the fluidized bed furnace from the hearth, and the oxygen-containing gas 8 is introduced into the fluidized bed furnace 100 from the furnace side part. The fluidized gas 7 passes through the gas dispersion part 10 formed of the gas dispersion layer 4, comes into contact with the original coal in the fluidized bed part 20, and is subjected to fluid activation of the original coal. In addition, the oxygen-containing gas 8 (specifically, oxygen in the gas) comes into contact with the original coal 6 during the fluid activation and is subjected to local fluid activation of the original coal. It is presumed that such local activation of the original coal by the oxygen-containing gas makes it possible to locally develop mesopores while maintaining micropores, and as a result, a carbonaceous material in which the benzene adsorption amount and the vitamin B12 adsorption amount are in specific ranges is advantageously produced.

As conditions for the activation of the original coal, conventionally known conditions may be employed except that an oxygen-containing gas is introduced separately from the fluidized gas. For example, the temperature at the time of activation may be 700 to 1000° C. (preferably 800 to 1000° C., more preferably 850 to 950° C.), and the time of activation may be any time during which an intended benzene adsorption amount (an intended degree of progress of activation) is achieved.

In the production method of the present embodiment, as described above, it is possible to produce a desired carbonaceous material in which the benzene adsorption amount, the vitamin B12 adsorption amount, and the mesopore micropore volume are in specific ranges by the action of an oxygen-containing gas introduced separately from the fluidized gas. While the activation of the original coal by water vapor or carbon dioxide in the fluidized gas is an endothermic reaction, the activation of the original coal by oxygen in the oxygen-containing gas is a rapid exothermic reaction. Therefore, in the production method of the present embodiment in which the oxygen-containing gas is brought into contact with the original coal during the fluid activation, the heat supply from the outside required for maintaining the activation of the original coal can be reduced, which is extremely advantageous also from the viewpoint of energy balance.

After being subjected to the activation of the original coal, the fluidized gas 7 and the oxygen-containing gas 8 are discharged to the outside of the furnace through the gas outlet (exhaust gas 9 in FIG. 2). Thermal energy of the exhaust gas may be reused by circulating some or all of the exhaust gas or exchanging heat.

FIGS. 1 and 2 illustrate a fluidized bed furnace including one fluidized gas inlet 1, one oxygen-containing gas inlet 2, and one gas outlet 3, but FIGS. 1 and 2 are merely schematic views, and the fluidized bed furnace may include a plurality of fluidized gas inlets 1, a plurality of oxygen-containing gas inlets 2, and a plurality of gas outlets 3. When a plurality of oxygen-containing gas inlets 2 are included, the oxygen-containing gas inlets 2 may be disposed at the same position (height) as viewed in the flow main direction Z of the fluidized gas, or may be disposed at different positions (heights).

When a plant-based carbonaceous precursor such as a coconut shell or a mineral-based carbonaceous precursor containing impurities such as alkali metal, alkaline earth metal, and transition metal is used, the carbonaceous material after activation is washed to remove ash and chemicals. Therefore, in an embodiment, the production method of the present invention may include a step of washing the carbonaceous material after activation. In that case, a mineral acid or water is used for washing, and hydrochloric acid having high washing efficiency is preferable as the mineral acid. In the case of washing (pickling) the carbonaceous material using a mineral acid such as hydrochloric acid, it is preferable to perform a deacidification treatment by performing water washing or the like after pickling.

After washing, the obtained carbonaceous material is dried, and pulverized and sieved as necessary to obtain a carbonaceous material product.

[Water Purification Filter]

A water purification filter can be produced using a carbonaceous material. Hereinafter, a water purification filter according to a preferred embodiment is described.

In a preferred embodiment, the water purification filter includes the carbonaceous material according to the present embodiment and the fibrous binder as described above.

The fibrous binder is not particularly limited as long as it can be fibrillated to entangle the carbonaceous material and shape, and can be widely used regardless of synthetic products and natural products. Examples of such a fibrous binder include acrylic fibers, polyethylene fibers, polypropylene fibers, polyacrylonitrile fibers, cellulose fibers, nylon fibers, aramid fibers, and pulp. The fiber length of the fibrous binder is preferably 4 mm or less.

Two or more kinds of the fibrous binders may be used in combination. It is particularly preferred to use polyacrylonitrile fibers or pulp as a binder. Accordingly, it is possible to further increase the density of the molded body and the strength of the molded body and to suppress deterioration in performance.

In a preferred embodiment, the water permeability of the fibrous binder is on the order of 10 to 150 mL in terms of CSF value. In the present embodiment, the CSF value is a value measured in accordance with the Canadian standard freeness method of JIS P 8121 "Testing methods for freeness of pulp". The CSF value can be adjusted, for example, by fibrillating the fibrous binder. When the CSF value of the fibrous binder is less than 10 mL, water permeability cannot be obtained, the strength of the molded body decreases, and the pressure loss may also increase. On the other hand, when the CSF value exceeds 150 mL, the powdered activated carbon cannot be sufficiently held, the strength of the molded body is lowered, and the adsorption performance may be poor.

The water purification filter preferably contains 4 to 10 parts by mass and more preferably 4.5 to 6 parts by mass of the fibrous binder based on 100 parts by mass of the carbonaceous material from viewpoints of removal performance of a substance to be removed and moldability. Therefore, in a preferred embodiment, the water purification filter includes the carbonaceous material according to the present embodiment and the fibrous binder, the CSF value of the fibrous binder is 10 to 150 mL, and 4 to 10 parts by mass of the fibrous binder is included with respect to 100 parts by mass of the carbonaceous material. When the water purification filter contains other functional components to be described later, "with respect to 100 parts by mass of carbonaceous material" as to the filter composition may be read as "with respect to 100 parts by mass of the total of carbonaceous material and other functional components" and applied.

The water purification filter may contain other functional components as long as the effect of the present invention is not inhibited. Examples of the other functional component include a lead adsorbent such as titanosilicate or a zeolite-based powder capable of adsorbing and removing soluble lead, an ion exchange resin or a chelating resin, and various adsorbents containing a silver ion and/or a silver compound for imparting antibacterial properties.

Since the water purification filter according to the present embodiment contains the carbonaceous material according to the present embodiment, it is possible to efficiently remove PFAS. The passing water condition is not particularly limited, but the water passing condition is carried out at a space velocity (SV) of 300 to 6500/hr so that the pressure loss does not become extremely large. The performance of the water purification filter can be confirmed by plotting the relationship between each removal rate calculated from the concentration of the substance to be removed in the raw water and the permeated water and the ratio (cumulative permeated water amount L/mL) of the water amount (L) allowed to flow from the start of passing water and the volume (mL) of the water purification cartridge.

[Water Purifier]

A water purifier can be manufactured using a carbonaceous material or a water purification filter. In a preferred embodiment, the water purifier includes the carbonaceous material or the water purification filter according to the present embodiment as described above.

In a preferred embodiment, the water purifier includes a water purification cartridge, and the water purification cartridge is configured using the carbonaceous material or the water purification filter according to the present embodiment. For example, the carbonaceous material according to the present embodiment may be filled in a housing to constitute a water purification cartridge, and the water purification filter according to the present embodiment may be filled in a housing to constitute a water purification cartridge. The water purification cartridge may include, in addition to the carbonaceous material or the water purification filter according to the present embodiment, a combination of known nonwoven fabric filters, various adsorbents, mineral additives, ceramic filtering mediums, hollow fiber membranes, and the like.

The present specification discloses various aspects of the technique as described above, and the main techniques are summarized below.

That is, the carbonaceous material according to one aspect of the present invention has the benzene adsorption amount of 30 to 60%, a vitamin B12 adsorption amount of more than 50.0 mg/g, and a micropore volume of mesopores of 0.13 to 0.30 cm$^3$/g as calculated from a nitrogen adsorption isotherm by a BJH method.

With such a configuration, it is possible to provide a carbonaceous material which has high PFAS (PFOS, PFOA, etc.) removal performance and can be used also for the water purifier application.

Further, in the carbonaceous material, a specific surface area calculated by a BET method from a nitrogen adsorption isotherm is preferably 1200 to 2000 m$^2$/g. With such a configuration, it is considered that the adsorption removal performance required for the water purifier can be achieved at a high level.

Furthermore, in the carbonaceous material, the average micropore diameter calculated from the nitrogen adsorption isotherm is preferably 1.85 to 1.90 nm. Accordingly, it is considered that PFAS can be more efficiently removed.

Further, in the carbonaceous material, the electrical conductivity measured by a powder resistance measurement under a load of 12 kN is preferably 3 to 9 S/cm. Accordingly, it is considered that the adsorption removal performance required for the water purifier can be achieved at a high level.

The carbonaceous material is preferably derived from a plant-based carbonaceous precursor. As a result, it is considered that the carbonaceous material is likely to be excellent in adsorption performance of the substance to be removed defined by the household product quality display method. Furthermore, it is considered that the plant-based carbonaceous precursor is preferably coconut shell, whereby a carbonaceous material capable of more efficiently removing PFAS can be achieved.

Furthermore, in the carbonaceous material, the removal performance of the fluorine-containing organic compound obtained under the following measurement conditions is preferably 12000 or more in Bed Volume.

Measurement conditions: water (containing TOC of 1.2 ppm) adjusted to a PFOA concentration of 50±10 ppt and a PFOS concentration of 50±10 ppt is used as test water in a stainless steel column filled with a carbonaceous material and having a diameter of 6.2 mm, a height of 25.4 mm, and an internal volume of 0.77 mL, and under conditions of 7.2 mL/min and a space velocity (SV) of 560 hr$^{-1}$, the removal performance is defined as the amount of water (Bed Volume) from the start of passing water to the breakthrough point, which is obtained when water is passed upflow and the point at which the removal rate becomes lower than 80% is defined as the breakthrough point. Accordingly, it is considered that the effect can be more reliably obtained.

A method for producing a carbonaceous material according to another aspect of the present invention is characterized by using a fluidized bed furnace, the method including introducing, separately from a fluidized gas introduced from a hearth, an oxygen-containing gas into the fluidized bed furnace so that the oxygen concentration in a gas that is a total gas of the fluidized gas and the oxygen-containing gas is 0.004 to 1 vol %. With such a configuration, an excellent carbonaceous material as described above can be obtained.

In the production method, the water vapor concentration in the fluidized gas introduced from the hearth is preferably 10 to 40 vol %. Accordingly, it is considered that the original coal can be efficiently activated.

Furthermore, in the production method, it is preferable that the fluidized bed furnace includes a gas dispersion part on an upstream side in the fluidized bed furnace as viewed in a flow main direction Z of the fluidized gas, and the method includes, when an upstream end position of the gas dispersion part in the direction Z is 0 (m), a downstream end position is t1 (m), and a position at which the oxygen-containing gas is introduced is t2 (m), introducing the oxygen-containing gas so as to satisfy a relationship of $0.5t1 \leq t2$. Accordingly, it is considered that an excellent carbonaceous material as described above can be more reliably obtained.

A water purification filter according to still another aspect of the present invention contains the carbonaceous material and the fibrous binder as described above, the fibrous binder has a CSF value of 10 to 150 mL, and 4 to 10 parts by mass of the fibrous binder is contained with respect to 100 parts by mass of the carbonaceous material. The present invention also includes a water purifier including the carbonaceous material as described above, a fluorine-containing organic compound removing material including the carbonaceous material as described above, and a water purifier including the water purification filter.

EXAMPLES

Hereinafter, the present invention is described more specifically with reference to Examples, but the present invention is not limited by Examples at all.

<Evaluation Method>

Each physical property values in Examples was measured by the following methods.

[Measurement of Benzene Adsorption Amount]

The carbonaceous materials prepared in Examples and Comparative Examples were dried in a constant temperature dryer at 115° C. for 3 hours, and then cooled to room temperature in a desiccator using silica gel as a desiccant. Next, in a thermostatic chamber at 20° C., dry air containing benzene having a concentration of 1/10 of the saturated concentration was passed through the carbonaceous material. From the mass of the carbonaceous material that reached the adsorption equilibrium and the mass of the carbonaceous material before adsorption (that is, the mass of the carbonaceous material after drying and cooling), the benzene adsorption amount (mass %) was determined according to the following formula (1).

$$\text{Benzene adsorption amount (mass \%)} = [\{(\text{sample mass after benzene adsorption}) - (\text{sample mass before benzene adsorption})\} / (\text{sample mass before benzene adsorption})] \times 100 \qquad \text{[Formula (1)]}$$

[Measurement of Vitamin B12 Adsorption Amount]

The carbonaceous materials prepared in Examples and Comparative Examples were pulverized so that the 50% particle size (D50) of the volume-based cumulative distribution of the carbonaceous material was about 9 to 11 μm, dried in a constant temperature dryer at 115° C. for 3 hours, and then were cooled to room temperature in a desiccator using silica gel as a desiccant. The particle size of the pulverized carbonaceous material was measured by a laser diffraction measurement method. That is, a carbonaceous material to be measured was placed in ion-exchanged water together with a surfactant, and subjected to ultrasonic vibration to prepare a uniform dispersion, and measurement was performed using Microtrac MT3200 manufactured by MicrotracBEL Corp. As a surfactant, "polyoxyethylene (10) octylphenyl ether" manufactured by FUJIFILM Wako Pure Chemical Corporation was used. The analysis conditions are shown below.

(Analysis Conditions)

Number of measurements: once

Measurement time: 30 seconds

Distribution display: volume

Particle size segment: standard calculation mode: MT3000

Solvent name: WATER

Measurement upper limit: 1408 μm, measurement lower limit: 0.265 μm

Residual ratio: 0.00

Passage fraction ratio: 0.00

Residual ratio setting: invalid

Particle permeability: permeable

Particle refractive index: 1.81

Particle shape: non-spherical

Solvent refractive index: 1.333 DV value: 0.0100 to 0.0500

Transmittance (TR): 0.750 to 0.920

Flow rate: 50%

To 0.050 g of the carbonaceous material obtained, 100 mL of an aqueous solution of vitamin B12 (C63H88N14O14PCo: molecular weight 1355.4) adjusted to about 300 ppm was added, and the mixture was stirred at 25° C. for 24 hours. Thereafter, the absorbance at 330 nm was measured for the filtrate obtained by filtering the carbonaceous material and about 300 ppm of vitamin B12 test water used in the adsorption test, and the concentration of vitamin B12 was calculated based on a calibration curve prepared in advance. From the obtained concentration of vitamin B12, the vitamin B12 adsorption amount per 1 g of the carbonaceous material was calculated by the following formula (2).

$$\text{Vitamin } B12 \text{ adsorption amount (mg/g)} = \{\text{concentration of vitamin } B12 \text{ before adsorption (ppm)} - \text{concentration of vitamin } \beta 12 \text{ after adsorption treatment (ppm)}\} \times 0.1/\text{mass of carbonaceous material (g)} \qquad \text{[Formula (2)]}$$

[Measurement of Nitrogen Adsorption Isotherm]

Using BELSORP-mini manufactured by MicrotracBEL Corp., the carbonaceous material was heated at 300° C. for 3 hours under a nitrogen stream (nitrogen flow rate: 50 mL/min), and then the nitrogen adsorption/desorption isotherm of the carbonaceous material at 77 K was measured.

[Measurement of Specific Surface Area]

The nitrogen adsorption isotherm obtained by the above method was analyzed by a multipoint method using the BET equation, and the specific surface area was calculated from the straight line in the region of the relative pressure P/P0=0.01 to 0.1 of the obtained curve.

[Measurement of Total Micropore Volume and Average Micropore Diameter]

The total micropore volume was calculated by the Gurvish method from the nitrogen adsorption amount at a relative pressure P/P0=0.99 in the nitrogen adsorption isotherm obtained by the above method. The average micropore diameter was calculated based on the following formula (3) from the total micropore volume and the specific surface area obtained from the BET method described above.

$$\text{Average micropore diameter (nm)} = \text{total micropore volume (cm}^3\text{/g)/specific surface area (m}^2\text{/g)} \times 4000 \qquad \text{[Formula (3)]}$$

[Measurement of Mesopore Micropore Volume by BJH Method]

The BJH method was applied to the nitrogen adsorption isotherm obtained by the above method, and the micropore volume of mesopore was calculated. In the analysis by the BJH method, a reference curve "NGCB-BEL.t" provided by MicrotracBEL Corp. was used.

[Measurement of Electrical Conductivity]

The electrical conductivity of the carbonaceous material was measured using a powder resistivity measurement unit (MCP-PD51, manufactured by Mitsubishi Chemical Analytech Co., Ltd.). Since the particle size of the measurement sample greatly affects the measurement of the electrical conductivity, the electrical conductivity of the carbonaceous material pellet, which was pulverized so that the 50% particle size (D50) of the volume-based cumulative distribution of the carbonaceous material is about 5 to 8 μm and on which a load of 12 kN was applied, was measured. The particle size of the pulverized carbonaceous material was measured by a laser diffraction measurement method. The measurement procedure and analysis conditions of the particle size of the carbonaceous material are as described above in [Measurement of vitamin B12 adsorption amount].

Example 1

The particle size of coconut shell coal obtained by carbonizing a coconut shell produced in the Philippines was adjusted from 30 mesh (0.5 mm) to 60 mesh (0.25 mm). The coconut shell coal (1 kg) was charged into a fluidized bed activation furnace heated to 900° C., and a fluidized gas of 50 L/min with 15 vol % of water vapor and 11 vol % of carbon dioxide from the hearth and an oxygen-containing gas of 5 L/min with 0.5 vol % of oxygen and 99.5 vol % of nitrogen were introduced from the furnace side part and the activation treatment was performed until the benzene adsorption amount reached about 53.3 wt % (the oxygen concentration in the total gas introduced into the fluidized bed activation furnace was about 0.045 vol %). As the fluidized bed activation furnace, a furnace provided with a gas dispersion layer on the upstream side in the furnace as viewed in the flow main direction Z of the fluidized gas was used. In addition, the introduction position t2 of the oxygen-containing gas in the direction Z and the downstream end t1 of the gas dispersion layer satisfied a relationship of t1<t2. That is, the oxygen-containing gas was introduced into the fluidized bed part of the fluidized bed activation furnace.

The obtained activated coal was washed with dilute hydrochloric acid, and then sufficiently washed with ion-exchanged water in order to remove residual hydrochloric acid, and dried to obtain a carbonaceous material. The treatment conditions and physical property values of the obtained carbonaceous material are shown in Table 1.

Example 2

A carbonaceous material was obtained in the same manner as in Example 1 except that the concentration of the oxygen-containing gas introduced during the activation treatment was changed to 1.0 vol % of oxygen and 99.0 vol % of nitrogen, and the activation treatment was performed until the benzene adsorption amount reached 45.7 wt %. The treatment conditions and physical property values of the obtained carbonaceous material are shown in Table 1.

Example 3

A carbonaceous material was obtained in the same manner as in Example 1 except that the concentration of the oxygen-containing gas introduced during the activation treatment was changed to 3.0 vol % of oxygen and 97.0 vol % of nitrogen, and the activation treatment was performed until the benzene adsorption amount reached 52.6 wt %. The treatment conditions and physical properties of the obtained carbonaceous material are shown in Table 1.

Comparative Example 1

A carbon material was obtained in the same manner as in Example 1 except that the activation treatment was performed until the benzene adsorption amount reached about 34.4 wt %. The treatment conditions and physical properties of the obtained carbonaceous material are shown in Table 1.

Comparative Example 2

The particle size of coconut shell coal obtained by carbonizing a coconut shell produced in the Philippines was adjusted from 30 mesh (0.5 mm) to 60 mesh (0.25 mm). The coconut shell coal (5 g) was charged into a horizontal electric tube furnace in which a quartz tube having an inner diameter of 42 mm was set. Water was bubbled with a gas of 0.5 vol % of oxygen and 99.5% of nitrogen at 1 L/min to introduce water vapor into the furnace, the furnace was heated to 900° C., and the activation treatment was performed until the benzene adsorption amount reached 32.3 wt %. The obtained activated coal was washed with dilute hydrochloric acid, and then sufficiently washed with ion-exchanged water in order to remove residual hydrochloric acid, and dried to obtain a carbonaceous material. The treatment conditions and physical properties of the obtained carbonaceous material are shown in Table 1.

Comparative Example 3

A carbonaceous material was obtained in the same manner as in Example 1 except that the concentration of the oxygen-containing gas introduced during the activation treatment was changed to 0.1 vol % of oxygen and 99.9 vol % of nitrogen, and the activation treatment was performed until the benzene adsorption amount reached 46.6 wt %. The treatment conditions and physical property values of the obtained carbonaceous material are shown in Table 1.

Comparative Example 4

A carbonaceous material was obtained in the same manner as in Example 1 except that the concentration of the oxygen-containing gas introduced during the activation treatment was changed to 10.0 vol % of oxygen and 90.0 vol % of nitrogen, and the activation treatment was performed until the benzene adsorption amount reached 53.0 wt %. The treatment conditions and physical property values of the obtained carbonaceous material are shown in Table 1.

Comparative Example 5

The particle size of coconut shell coal obtained by carbonizing coconut shell produced in the Philippines was adjusted from 10 mesh (1.7 mm) to 30 mesh (0.5 mm). The coconut shell coal (1 kg) was charged into a rotary kiln heated to 900° C., and an activation gas of 10 L/min with 15 vol % of water vapor and 11 vol % of carbon dioxide and an additional gas of 1 L/min with 0.5 vol % of oxygen and 99.5 vol % of nitrogen were introduced, and the activation treatment was performed until the benzene adsorption amount reached about 62.3 wt %.

The obtained activated coal was washed with dilute hydrochloric acid, and then sufficiently washed with ion-exchanged water in order to remove residual hydrochloric acid, and dried to obtain a carbonaceous material. The treatment conditions and physical properties of the obtained carbonaceous material are shown in Table 1.

Comparative Example 6

In an aqueous solution in which 0.28 g of calcium chloride and 0.96 g of citric acid were dissolved in 18.8 mL of ion-exchanged water, 10 g of granular activated carbon AquaCarb1240C manufactured by Evoqua was immersed and allowed to stand for 12 hours. Thereafter, the aqueous solution was removed by suction filtration, and about half of the obtained calcium/citric acid-impregnated activated carbon in the wet state was charged into an alumina boat, and the alumina boat was charged into a horizontal electric tube furnace equipped with a quartz tube having an inner diameter of 42 mm. Water was bubbled with a gas of 0.5 vol % of oxygen and 99.5% of nitrogen at 1 L/min to introduce water vapor into the furnace, the furnace was heated to 900° C., and the activation treatment was performed until the benzene adsorption amount reached 56.0 wt %.

The obtained activated coal was washed with dilute hydrochloric acid, and then sufficiently washed with ion-exchanged water in order to remove residual hydrochloric acid, and dried to obtain a carbonaceous material. The treatment conditions and physical properties of the obtained carbonaceous material are shown in Table 1.

Comparative Example 7

The particle size of coconut shell coal obtained by carbonizing coconut shell produced in the Philippines was adjusted from 10 mesh (1.7 mm) to 30 mesh (0.5 mm). This coconut shell coal (1 kg) was charged into a rotary kiln heated to 900° C., and an activation gas of 10 L/min with 15 vol % of water vapor and 11 vol % of carbon dioxide and an additional gas of 1 L/min with 0.5 vol % of oxygen and 99.5 vol % of nitrogen were introduced, and the activation treatment was performed until the benzene adsorption amount reached about 31.0 wt %.

The obtained activated coal was washed with dilute hydrochloric acid, and then sufficiently washed with ion-exchanged water in order to remove residual hydrochloric acid, and dried to obtain a carbonaceous material. The treatment conditions and physical properties of the obtained carbonaceous material are shown in Table 1.

18

[PFOA+PFOS Filtration Capacity Test]

Water (containing TOC of 1.2 ppm) adjusted to a PFOA concentration of 50±10 ppt and a PFOS concentration of 50±10 ppt was used as test water, and the test water was passed upflow under conditions of 7.2 mL/min and a space velocity (SV) of 560 $hr^{-1}$ and a filtration capacity test was performed using a point at which the removal rate was lower than 80% as a breakthrough point. In the test, samples having a filtration capacity of 12000 (Bed Volumes) or more were rated acceptable. The passing water test conditions and results are shown in Table 2 and FIG. 3.

TABLE 2

|  | Particle size in passing water test mesh | Filling volume mL | Space velocity (SV) $hr^{-1}$ | PFAS removal capacity BV |
|---|---|---|---|---|
| Example 1 | 120 to 200 | 0.77 | 560 | 24000 |
| Example 2 | 120 to 200 | 0.77 | 560 | 17500 |
| Example 3 | 120 to 200 | 0.77 | 560 | 20000 |

TABLE 1

|  | Activation furnace | Particle size during activation mesh | Oxygen concentration in oxygen-containing gas vol. % | Oxygen concentration in total gas vol. % | Filling density g/mL | Benzene adsorption amount % | Vitamin B12 adsorption amount mg/g | Mesopore volume (BJH method) cm³/g | Specific surface area m²/g | Average micropore diameter nm | Powder electrical conductivity S/cm |
|---|---|---|---|---|---|---|---|---|---|---|---|
| Example 1 | Fluidized bed furnace | 30 to 60 | 0.5 | 0.045 | 0.405 | 53.3 | 183.0 | 0.149 | 1710 | 1.85 | 8.0 |
| Example 2 | Fluidized bed furnace | 30 to 60 | 1 | 0.091 | 0.440 | 45.7 | 405.0 | 0.131 | 1538 | 1.84 | 9.5 |
| Example 3 | Fluidized bed furnace | 30 to 60 | 3 | 0.27 | 0.410 | 52.6 | 205.0 | 0.164 | 1669 | 1.88 | 7.3 |
| Comparative Example 1 | Fluidized bed furnace | 30 to 60 | 0.5 | 0.045 | 0.480 | 34.4 | 21.0 | 0.079 | 1132 | 1.77 | 7.8 |
| Comparative Example 2 | Tube furnace | 30 to 60 | 0.5 | 0.5 | 0.473 | 32.3 | 2.3 | 0.042 | 1210 | 1.75 | 10.3 |
| Comparative Example 3 | Fluidized bed furnace | 30 to 60 | 0.1 | 0.0091 | 0.444 | 46.6 | 38.3 | 0.147 | 1571 | 1.88 | 6.5 |
| Comparative Example 4 | Fluidized bed furnace | 30 to 60 | 10 | 0.91 | 0.412 | 53.0 | 305.0 | 0.320 | 1640 | 1.86 | 5.6 |
| Comparative Example 5 | Rotary kiln | 10 to 30 | 0.5 | 0.045 | 0.386 | 62.3 | 52.0 | 0.256 | 1815 | 1.85 | 12.1 |
| Comparative Example 6 | Tube furnace | 12 to 40 | 0.5 | 0.5 | 0.392 | 56.0 | 300.0 | 0.420 | 1680 | 1.96 | 8.2 |
| Comparative Example 7 | Rotary kiln | 10 to 30 | 0.5 | 0.045 | 0.474 | 31.0 | 2.0 | 0.036 | 1174 | 1.71 | 10.9 |

[Evaluation of Filtration Capacity of Carbonaceous Material]

The carbonaceous materials prepared in Examples 1 to 3 and Comparative Examples 1 to 7 were packed in a stainless steel column having a diameter of 6.2 mm, a height of 25.4 mm, and an internal volume of 0.77 mL, and a filtration capacity test of PFOA+PFOS was performed according to the procedure described below in accordance with the Prediction Of Contaminant Adsorption On GAC In Aqueous Systems Using Rapid Small-Scale Column Tests specified in ASTM D6586-03 (2014). The carbonaceous material used in the present test was subjected to the present test after particle size adjustment to 120 mesh (125 μm) to 200 mesh (74 μm).

TABLE 2-continued

|  | Particle size in passing water test mesh | Filling volume mL | Space velocity (SV) $hr^{-1}$ | PFAS removal capacity BV |
|---|---|---|---|---|
| Comparative Example 1 | 120 to 200 | 0.77 | 560 | 9500 |
| Comparative Example 2 | 120 to 200 | 0.77 | 560 | 0 |
| Comparative Example 3 | 120 to 200 | 0.77 | 560 | 8000 |
| Comparative Example 4 | 120 to 200 | 0.77 | 560 | 6500 |

TABLE 2-continued

|  | Particle size in passing water test mesh | Filling volume mL | Space velocity (SV) $hr^{-1}$ | PFAS removal capacity BV |
|---|---|---|---|---|
| Comparative Example 5 | 120 to 200 | 0.77 | 560 | 7000 |
| Comparative Example 6 | 120 to 200 | 0.77 | 560 | 10000 |
| Comparative Example 7 | 120 to 200 | 0.77 | 560 | 0 |

(Discussion)

Figure 3:
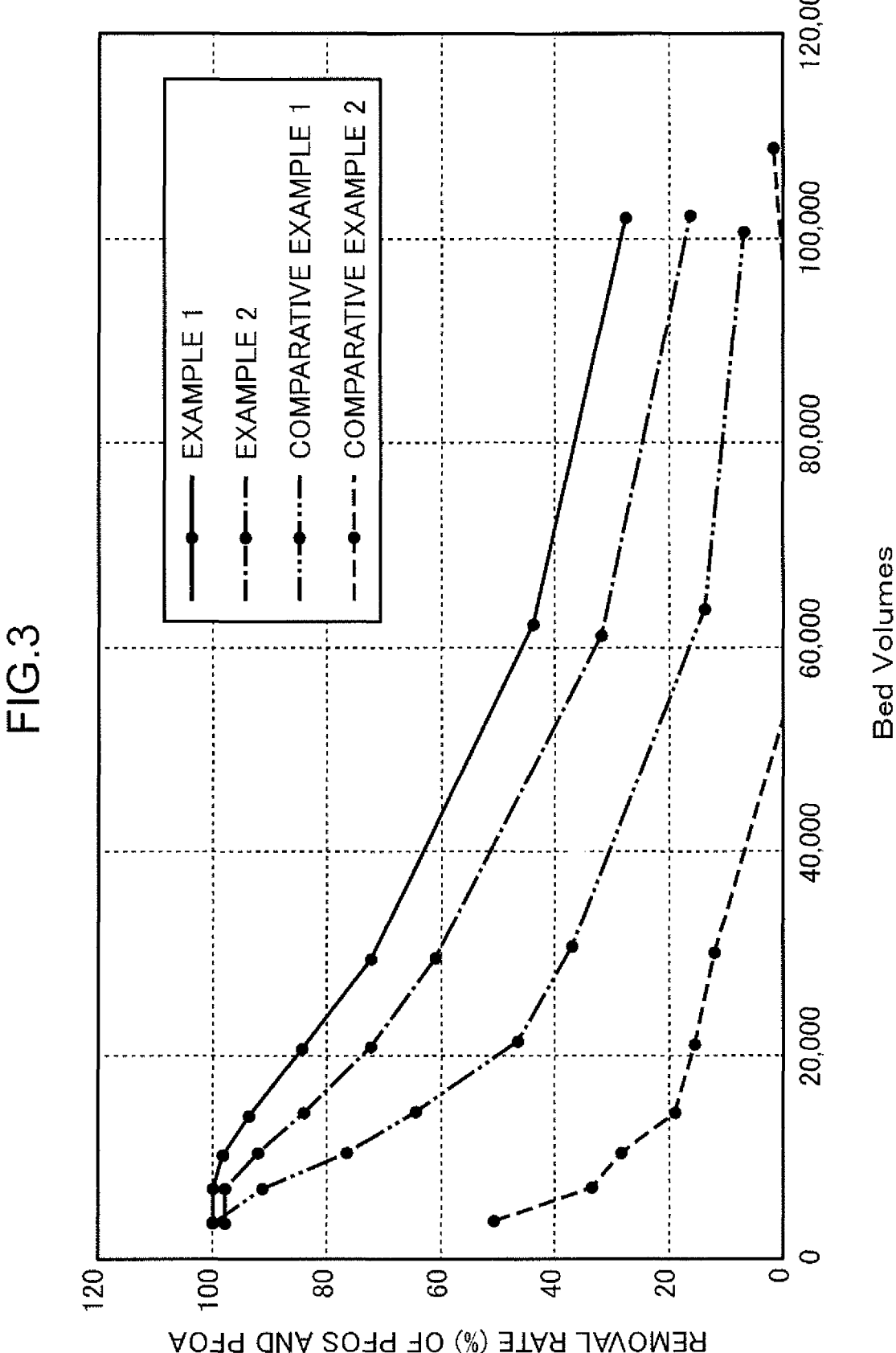
FIG. 3 is a graph showing a relationship between a removal rate of PFOS and PFOA and a Bed Volume in Examples and Comparative Examples of the present invention.

As is clear from the results of Table 2 and FIG. 3, it was confirmed that all of the carbonaceous materials of Examples according to the present invention can be used for the water purifier application and have an excellent PEAS removal capacity. In particular, it was also found that Examples 1 and 3 having an average micropore diameter of 1.85 nm or more exhibited more excellent removal capacity.

On the other hand, in Comparative Examples 1 to 7 in which at least one of the benzene adsorption amount, the vitamin B12 adsorption amount, and the mesopore micropore volume did not satisfy the requirements of the present invention, PFAS could not be sufficiently removed. In particular, in Comparative Example 2 and Comparative Example 7 in which both the vitamin B12 adsorption amount and the mesopore micropore volume did not satisfy the requirements of the present invention, the removal rate was significantly lower than 80% from the time point of the start of passing water, and the PFAS removal capacity was 0.

This application is based on Japanese Patent Application No. 2020-177898 filed on Oct. 23, 2020, the contents of which are included in the present invention.

Although the present invention is appropriately and fully described above through specific embodiments in order to express the present invention, it should be recognized that a person skilled in the art can easily modify and/or improve the foregoing embodiments. Therefore, unless a change or improvement made by a person skilled in the art is at a level departing from the scope of rights of the claims described in the claims, the change or improvement is interpreted to be included in the scope of rights of the claims.

INDUSTRIAL APPLICABILITY

The carbonaceous material of the present invention is particularly useful for removing a fluorine-containing organic compound. Therefore, the present invention has wide industrial applicability in water purification techniques such as a water purification filter and a water purifier.

The invention claimed is:

1. A carbonaceous material having a benzene adsorption amount of 30 to 60%, a vitamin B12 adsorption amount of more than 50.0 mg/g, and a volume of mesopores of 0.13 to 0.30 $cm^3/g$ as calculated from a nitrogen adsorption isotherm by a BJH method.

2. The carbonaceous material according to claim 1, wherein a specific surface area calculated by a BET method from the nitrogen adsorption isotherm is 1200 to 2000 $m^2/g$.

3. The carbonaceous material according to claim 1, wherein an average micropore diameter calculated from the nitrogen adsorption isotherm is 1.85 to 1.90 nm.

4. The carbonaceous material according to claim 1, wherein an electrical conductivity measured by powder resistance measurement under a load of 12 kN is 3 to 9 S/cm.

5. The carbonaceous material according to claim 1, wherein the carbonaceous material is derived from a plant-based carbonaceous precursor.

6. The carbonaceous material according to claim 5, wherein the plant-based carbonaceous precursor is a coconut shell.

7. The carbonaceous material according to claim 1, wherein removal performance of a fluorine-containing organic compound obtained under following measurement conditions is 12000 or more in Bed Volume, the measurement conditions: water (containing TOC of 1.2 ppm) adjusted to a PFOA concentration of $50\pm10$ ppt and a PFOS concentration of $50\pm10$ ppt is used as test water in a stainless steel column filled with a carbonaceous material and having a diameter of 6.2 mm, a height of 25.4 mm, and an internal volume of 0.77 mL, and under conditions of 7.2 mL/min and a space velocity (SV) of 560 $hr^{-1}$, a removal performance is defined as an amount of water (Bed Volume) from the start of passing water to a breakthrough point, which is obtained when water is passed upflow and a point at which a removal rate becomes lower than 80% is defined as the breakthrough point.

8. A method for producing the carbonaceous material according to claim 1 using a fluidized bed furnace, the method comprising introducing, separately from a fluidized gas introduced from a hearth, an oxygen-containing gas into the fluidized bed furnace so that an oxygen concentration in a total gas of the fluidized gas and the oxygen-containing gas is 0.004 to 1 vol %.

9. The method according to claim 8, wherein a water vapor concentration in the fluidized gas introduced from the hearth is 10 to 40 vol %.

10. The method according to claim 8, wherein the fluidized bed furnace includes a gas dispersion part on an upstream side in the fluidized bed furnace as viewed in a flow main direction Z of the fluidized gas, and the method comprises, when an upstream end position of the gas dispersion part in the direction Z is 0 (m), a downstream end position is t1 (m), and a position at which the oxygen-containing gas is introduced is t2 (m), introducing the oxygen-containing gas so as to satisfy a relationship of $0.5t1 \leq t2$.

11. A water purification filter comprising:

the carbonaceous material according to claim 1; and a fibrous binder, wherein the fibrous binder has a CSF value of 10 to 150 mL, and 4 to 10 parts by mass of the fibrous binder is contained with respect to 100 parts by mass of the carbonaceous material.

12. A water purifier comprising the carbonaceous material according to claim 1.

13. A water purifier comprising the water purification filter according to claim 11.

14. A fluorine-containing organic compound removing material comprising the carbonaceous material according to claim 1.

* * * * *